(12) United States Patent
Nakano

(10) Patent No.: US 6,391,439 B2
(45) Date of Patent: *May 21, 2002

(54) REWRITABLE INDICATION LABEL FOR RECORDING MEDIUM, RECORDING MEDIUM AND RECORDING MEDIUM CASE

(75) Inventor: Shigeru Nakano, Shinjuku-ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,301

(22) Filed: Jul. 31, 1997

(30) Foreign Application Priority Data

Aug. 2, 1996 (JP) ................................ 8-219101

(51) Int. Cl.$^7$ ................................ B41M 5/00
(52) U.S. Cl. ................ 428/321.5; 283/82; 428/354
(58) Field of Search ................ 283/82; 428/195, 428/206, 207, 29, 321.5, 354

(56) References Cited

U.S. PATENT DOCUMENTS

| | | | | |
|---|---|---|---|---|
| 4,098,935 A | * | 7/1978 | Knudsen | 428/40 |
| 4,701,372 A | | 10/1987 | Akiyama et al. | 428/323 |
| 4,948,450 A | | 8/1990 | Huerter et al. | 156/310 |
| 5,006,422 A | * | 4/1991 | Sakurai | 428/694 |
| 5,376,616 A | | 12/1994 | Hamano et al. | 503/216 |

FOREIGN PATENT DOCUMENTS

| | | | | |
|---|---|---|---|---|
| EP | 0 790 617 A2 | | 8/1997 | 428/1 |
| JP | 07-192104 | * | 7/1995 | 428/321.5 |
| JP | 07-271315 | * | 10/1995 | 428/321.5 |
| JP | 08-2159 | * | 1/1996 | 428/321.5 |
| JP | 08-132771 | * | 5/1996 | 428/321.5 |
| JP | 08-297470 | * | 11/1996 | 428/321.5 |
| WO | WO 92/22434 | | 12/1992 | |

* cited by examiner

Primary Examiner—Bruce H. Hess
(74) Attorney, Agent, or Firm—Parkhurst & Wendel, L.L.P.

(57) ABSTRACT

A rewritable indication device layer on which visible information is rewritably recorded and erased, is formed on a label base layer. A protection layer for protecting the rewritable indication device layer is formed on the rewritable indication device layer. The rewritable indication label for a recording medium having such structure, is adhered to a recording medium or a recording medium case.

6 Claims, 1 Drawing Sheet

REWRITABLE INDICATION LABEL FOR RECORDING MEDIUM, RECORDING MEDIUM AND RECORDING MEDIUM CASE

BACKGROUND OF THE INVENTION

The present invention relates to a rewritable indication label for a recording medium, a recording medium, and a recording medium case, more specifically a rewritable indication label for a recording medium which can rewritably indicate information in images visible and readable to man, a recording medium and a recording medium case.

Recently various recording materials typically exemplified by magnetic memories, IC memories, etc. have been proposed, and are used in various fields as recording media for letters, figures, signs, sounds, pictures, etc. Such recording media bear labels, etc. on which titles, file names, names, dates and other matters are printed to indicate contents, etc. recorded therein.

Usually such labels have required matters of the recording media printed on the surfaces and are adhered to the packaging cases of the recording media or the surfaces of recording media, such as disks, etc. by means of adhesives after the releasable sheets or others are peeled off.

In some of such recording media information can be written and erased as required. For example, music pieces or others recorded in the recording media can be erased to record different music pieces, or different music pieces are additionally recorded.

When contents of the recording media are replaced, or written or erased as required, printed matters on the labels adhered to the recording media must be accordingly replaced, or written or erased.

However, in such labels, very inconveniently matters once printed on blanks thereof with ball-point pens, fountain pens, etc. cannot be easily erased. It is not exaggerated that matters printed on such labels cannot be rewritten or erased as required.

It is usual to replace used labels by new ones, or to additionally print new matters on blanks thereof if any. This is very inconvenient.

SUMMARY OF THE INVENTION

In view of the above, the present invention is to provide a label for a recording medium which can indicate information visibly and readably to man, and can erase and rewrite information, a recording medium, and a recording medium case.

The inventors of the present invention made various studies to solve the above-described disadvantages. In view of the fact that some magnetic recording layers and heat-sensitive recording layers can be rewritably printed visibly, they applied this fact to an indication label and produced a rewritable indication label for a recording medium which comprises a label base layer, a rewritable indication device layer provided on the label base layer, on which visible information can be rewritably recorded or erased, and a protection layer provided on the rewritable indication device layer for protecting the rewritable indication device layer, and found that a man can visually see and read the information, and can rewrite and erase the information on the rewritable indication device label. Based on this finding, they made the present invention.

That is, the present invention relates to a rewritable indication label for a recording medium comprising a label base layer, a rewritable indication device layer provided on the label base layer, which can rewritably record and erase visible information, and a protection layer provided on the rewritable indication device layer, for protecting the rewritable indication device layer, and a recording medium and a recording medium case.

EMBODIMENTS OF THE PRESENT INVENTION

The present invention will be explained in more detail.

Figure 1:
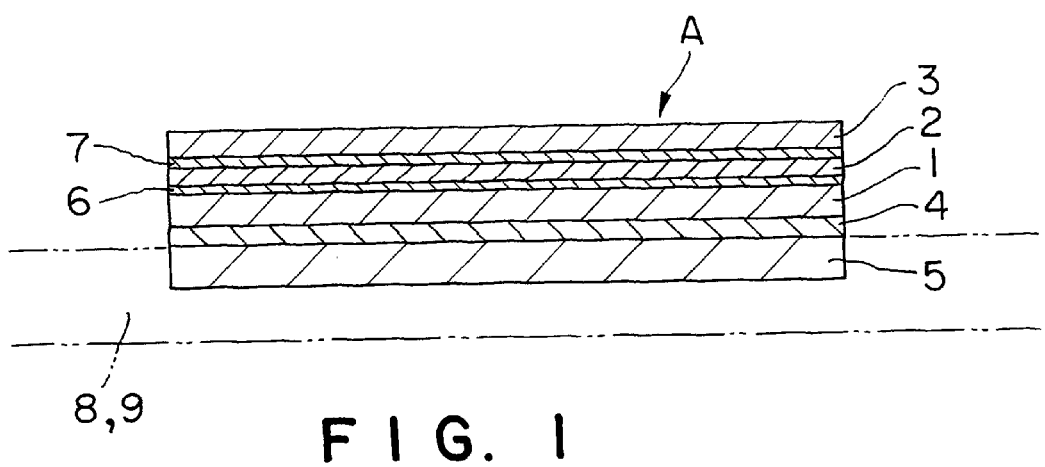
FIG. 1 is a sectional view of one example of the rewritable indication label for a recording medium according to the present invention.

An example of the rewritable indication label for a recording medium according to the present invention will be shown, and a structure thereof will be explained with reference to the drawings. FIG. 1 is a sectional view of the example of the rewritable indication label according to the present invention.

As shown in FIG. 1, the rewritable indication label for a recording medium A according to the present invention comprises a label base layer 1, a rewritable indication device layer (rewritable indication layer) 2 provided on one side of the label base layer 1 for rewritably recording and erasing visible information, and a protection layer 3 provided on one side of the rewritable indication device layer 2 for protecting the rewritable indication device layer 2. An adhesive layer 4 and a releasable sheet 5 are laminated on the other side of the label base layer 1.

In the present invention, it is possible that primer layers 6, 7 are provided between the label base layer 1 and the rewritable indication device layer 2, and between the rewritable indication device layer 2 and the protection layer 3 respectively so as to enhance close-tightness between the respective layers.

The rewritable indication label A having this structure can be adhered to a recording medium 8 or a recording medium case 9 by peeling off the releasable sheet 5 and applying in the label A thereto.

In the present invention the label base layer 1 may be formed of, e.g., various kinds of paper, various kinds of synthetic paper, various kinds of synthetic resin films or sheets, various kinds of metal sheets, or laminated bodies having combinations of two or more of them.

In the present invention, for vivid contrast of indications, the label base layer 1 may be colored in a required color, e.g., black, or a coloring layer of a required color, e.g., black may be formed on the label base layer 1.

In the present invention, the label base layer preferably has a 50–300 $\mu$m thickness.

Figure 2:
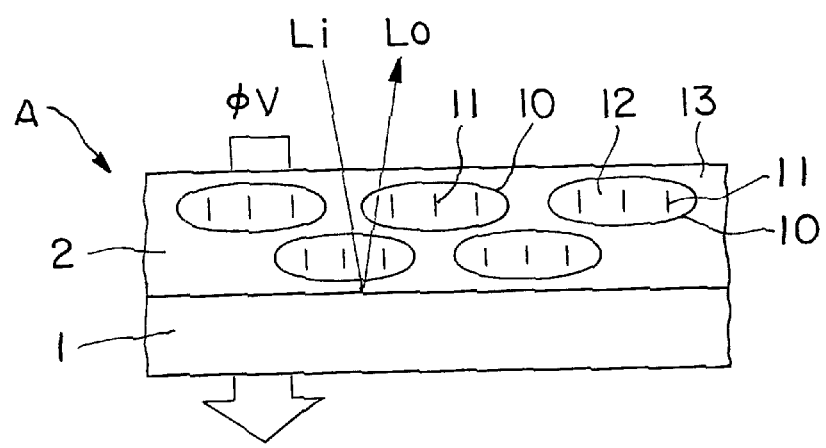
FIG. 2 is a sectional view of a magnetic recording layer including microcapsules containing a liquid and flake magnetic fine particles, which shows a mechanism of visible indication by the magnetic recording layer.

In the present invention, the rewritable indication device layer 2, for rewritably recording and erasing visible information, can be formed of, e.g., a magnetic recording layer containing microcapsules 10 containing a liquid 12 and flake magnetic fine particles 11 (FIG. 2). The rewritable indication device layer 2 can also be formed of a thermosensitive recording layer which is thermally changed reversibly from its transparent state to its opaque state and maintains the transparent state and the opaque state at a normal temperature, a thermosensitive recording layer containing a colloidal dye, or others.

The magnetic recording layer containing the microcapsules 10 containing the liquid 12 and the flake magnetic fine particles 11 will be detailed. The magnetic recording layer can be formed of a film of a magnetic composition applied to or printed on one side of the base layer 1 by the usual coating technique or by the usual printing technique. The magnetic composition is prepared by kneading a binder 13 (FIG. 2), the microcapsules 10 containing the liquid 12 and the flake magnetic fine particles 11, and additives as required.

The film of the magnetic composition preferably has an about 50 μm to 1 mm thickness.

The binder 13 may be any material, as long as it does not damage the walls of the microcapsules 10 and is adhesive to the surface of the label base layer 1. The binder 13 is exemplified by various kinds of natural, semi-synthetic or synthetic resins. Specifically, hydroxy ethylcellulose, carboxyl methylcellulose, nitrocellulose, polyvinyl alcohol, polyvinyl pyrrolidone, (meta)acryl-based resins, (meta) acrylamide-based resins, polyester-based resins, urethane-based resins, or others can be used.

The microcapsules 10 containing the liquid 12 and the flake magnetic fine particles can be prepared by the known microcapsulation technique. For example, first a thermoplastic resin is solved in the liquid to prepare a solvent. The flake magnetic fine particles 11 and required additives are further added to the solvent and sufficiently kneaded to prepare a dispersion liquid of the magnetic fine particles 11. On the other hand, a binder, e.g., gelatin, gum arabic or others, which forms microcapsule walls is solved in pure water or others to prepare a capsulation raw material liquid forming the microcapsules. The micro capsules 10 are formed by the known coacervation technique in which the dispersion liquid of the magnetic fine particles 11 is gradually added to the capsulation raw material liquid while being agitated.

The thus-formed microcapsules 10 preferably have, e.g., 10–100 μm particle size.

The thermoplastic resin can be one, for example, that is solved in a liquid, has good transparency and is not gelatinized by electric fields, magnetic fields, light, heat, etc. For example, polyvinyl chloride, polyvinyl butyral, polyvinyl acetate, acryl-based resins, acetylcellulose, ethylcellulose, and others can be used.

The liquid 12 can be various organic solvents, as long as they can solve the above-described thermoplastic resins. For example, one or more of hydrophilic liquids, polar organic liquids, or others can be used.

The flake magnetic fine particles 11 can be magnetic powder of iron, nickel, iron-nickel, stainless steel, such as iron-nickel-chrome or others, aluminium-cobalt alloy, samarium-cobalt alloy, or others.

It is preferable that the magnetic powder has the so-called flake shape which is as thin as possible and has a large ratio of a thickness to a particle size.

A particle size of the particles 1, is preferably 3–15 μm. When a particle size is too large, they cannot be capsulated, and when a particle size is too small, a light reflectance difference between a horizontal direction and a vertical direction is smaller, as will be described later, when the magnetic powder is magnetized. Unpreferably this makes contrast poor upon recording.

Preferably the magnetic powder normally has an above 500 oersted-coercive force.

In the present invention, coloring agents, such as dyes, pigments or others, may be contained in the microcapsules for the purpose of enhancing the contrast.

Figure 3:
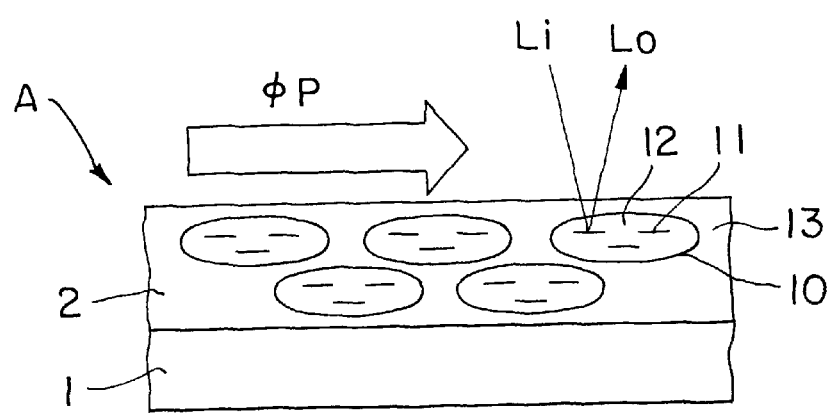
FIG. 3 is a sectional view of a magnetic recording layer including microsapsules containing a liquid and flake magnetic fine particles, which shows a mechanism of visible indication by the magnetic recording layer.

The operation of the rewritable indication of the magnetic recording layer, as described above, including the microcapsules 10 containing the above-described liquid 13 and the flake magnetic fine particles 11 as the rewritable indication device layer 2 of the present invention for recording and erasing visible information, will be explained. FIGS. 2 and 3 are sectional views of the magnetic recording layer including the microcapsules 10 containing the liquid 12 and the flake magnetic fine particles 11, which explain the mechanism of the rewritable indication.

As shown in FIGS. 2 and 3, when a vertical magnetic field φV is applied to the magnetic recording layer 2, the flake magnetic fine particles 11 within the microcapsules 10 is arranged in the vertical direction. Accordingly incident light Li from the outside reaches the surface of the label base layer 1, the light is reflected thereon to become reflection light Lo. In this case, a color of the label base layer 1 can be visually seen in the reflected light Lo (FIG. 2).

When a horizontal magnetic field φP is applied to the magnetic recording layer 2, the magnetic fine particles within the microcapsules 10 are arranged in the horizontal direction. Accordingly, the incident light Li from the outside is reflected on the magnetic powder 11 to become the reflected light Lo. In this case, the color of the magnetic fine particles 11 can be visually seen in the reflected light Lo (FIG. 3).

Thus, assuming that the state of FIG. 3 is an erased state, a light metal color can be visually seen from the outside. On the other hand, assuming that the state of FIG. 2 is a state partially written by the vertical magnetic field, when the label base layer 1 is black, the written parts are seen in black easily readably from the outside.

Needless to say, the above-described recorded state and erased state can be replaced by each other.

Then, a heat-sensitive recording layer as the rewritable indication device layer 2 of the present invention for recording and erasing visible information will be explained. The heat-sensitive recording layer can be reversibly changed by heat from a transparent state to an opaque state and retain the transparent and the opaque states at a normal temperature. The heat-sensitive recording layer is formed of a resin composition. The heat-sensitive recording layer may be formed of a film of the resin composition prepared by using, as a binder, e.g. polyvinyl chloride, a vinyl chloride-vinyl acetate copolymer, a vinyl chloride-vinylidene chloride copolymer, a polyester resin or other thermoplastic resin, and dispersing in the binder an organic low molecular weight substance, such as a saturated or an unsaturated fatty acid having 10–30 carbon atoms, or its ester, amide or ammonium salt, adding additives as required and sufficiently kneading them, and applying or printing the thus-prepared resin composition by the usual coating or printing technique.

It is preferable that a thickness of the film of the resin composition is about 50 μm–1 mm.

In the present invention, by printing the layer of the resin composition by, e.g., a thermal head at a temperature higher than a prescribed recording temperature, the printed part is turned opaque, whereby letters, etc. can be recorded. By heating to a temperature lower than the prescribed recording temperature and higher than the normal temperature and cooling, the entire film is turned transparent, whereby the letters, etc. can be erased. Thus the transparent and the opaque states are changed by heat reversibly from each other to enable the recording.

A compounding ratio of the thermoplastic resin to the organic low molecular weight substance is preferably 2:1 by weight.

Then, a heat sensitive recording layer containing a leuco-based dye as the rewritable indication device layer of the present invention for recording and erasing visible information will be explained. The heat sensitive recording layer is formed of a film of a heat sensitive recording composition of, e.g., a known electron donating color-reacting compound, an electron accepting compound, a binder as main component applied or printed by the usual coating technique or printing technique.

A thickness of the heat-sensitive recording composition is preferably about 50 μm–1 mm.

In the present invention, by printing the film of the heat-sensitive recording composition by a thermal head or others for recording, the printed part is colored, whereby letters, etc. can be recorded. The letters, etc. are erased by action of an erasing chemical agent. Thus, actions of heat and a chemical agent change reversibly from coloring to erasing, whereby the recording is enabled.

Then, in the present invention, the protection layer 3 for protecting the rewritable indication layer 2 is preferably transparent and invulnerable. The protection layer 3 is formed of a film prepared by applying or printing by the usual coating technique or printing technique a resin composition prepared by sufficiently kneading, e.g., a polyester resin, a (meta)acryl resin, a polycarbonate resin or others as a main component of a vehicle, and additives as required.

A thickness of the protection layer is preferably 20–200 μm.

In the present invention, it is preferable that the primer layers 6, 7, which are provided as required are formed by applying a liquid resin, as of a polyester resin, a (meta)acryl resin or others, and a thickness of the primer layers 6, 7 is 5–50 μm.

In the present invention, in use of the thus-formed rewritable indication label A for a recording medium, a title, a file name, a name, date and other matters are printed on the label A to indicate contents, etc. recorded in a recording medium exemplified by a magnetic memory, e.g., a magnetic tape, a magnetic floppy disc, a magnetic disc, a photoelectromagnetic disc or others, and then, the releasable sheet 5 is peeled off from the rewritable indication label A for a recording medium and is adhered to, through the adhesive layer 4, a surface or the like of the recording medium 8, such as a disc, or the packaging case 9.

Otherwise, it is possible that the releasable sheet 5 is peeled off from the label A, and the label A is adhered to, trough the adhesive layer 4, the surface or the like of the packaging case 9 or the recording medium 8, and then the label A is printed for the recording.

The recording and storing operation of the rewritable indication label A for a recording medium according to the present invention, i.e., writing and erasing, can be conducted as required. For example, a music piece first recorded in the recording medium is erased to record another music piece, or another music piece is recorded in addition to the first recorded music piece. Matters printed on the label A adhered to the recording medium can be rewritten or additionally written as required according to the rewriting or the additional recording in the recording medium 8.

EXAMPLES

The present invention will be explained by means of examples of the present invention.

Example 1

(1) Preparation of Dispersion Liquid of the Flake Magnetic Fine Particles

A mixed liquid comprising:

| | |
|---|---:|
| flake magnetic fine particles | 18.0 wt. parts |
| (iron-nickel alloy | iron:nickel = 64:36 |
| saturation magnetization | θs 129 |
| residual flux density | θr 65 |
| coercive force | Hc 540 |
| average particle size | 9.2 μm |
| specific gravity | 8.1 ) |
| ethyl cellulose | 7.5 wt. parts |
| dimethyl phthalate | 36.5 wt. parts |
| phenylxyl ethane | 36.5 wt. parts |
| coloring agent (dye) | 1.5 wt. parts |
| Total | 100.00 wt. parts | was agitated while being heated to 90° C. to solve the ethyl cellulose and the dye as a coloring agent, and a dispersion liquid of the flake magnetic fine particles was prepared.

(2) Preparation of Capsulation Raw Material Liquid

| | |
|---|---:|
| gelatin | 1.5 wt. parts |
| gum arabic | 15.0 wt. parts |
| pure water | 170.0 wt. parts |
| Total | 186.5 wt. parts |

The above mixed liquid was solved at 50° C. to prepare the capsulation raw material liquid.

(3) Preparation of Microcapsules 1.7 weight parts of a 2% NaOH aqueous solution was added to 80 weight parts of the thus-prepared capsulation raw material liquid, and while agitating them, 60 weight parts of the thus-prepared dispersion liquid of the flake magnetic fine particles were gradually added and emulsified into 50 μm-particles.

Then, 250 weight parts of pure water of 50° C. were added, and with the mixture system with the emulsion kept at 50° C. a pH of the system was adjusted with a 5% acetic acid aqueous solution.

Then, the emulsion was slowly cooled, and 4.2 weight parts of 50% glutaraldehyde were added, and they were agitated continuously for 3 hours to solidify the capsule walls, and a magnetic capsule slurry was obtained.

Then, the magnetic capsule slurry was passed through a mesh filter to unify the particle sizes, and microcapsules were prepared.

(4) Preparation of Rewritable Indication Label for Recording Medium

The mixed solution of

| | |
|---|---|
| the thus-formed microcapsules | 15.0 wt. parts |
| 20% polyvinyl alcohol solution | 10.0 wt. parts |
| Total | 25.0 wt. parts | was sufficiently kneaded and was applied to black-colored synthetic paper by gravure roll coating so as to have an about 100 μm-thickness after air drying. Further thereon a polyester resin film was laminated to form the protection layer, and the rewritable indication label for a recording medium according to the present invention was formed.

As usual, the synthetic paper had the releasable sheet adhered in advance to the other side thereof through the adhesive layer.

(5) Writing and Erasing in the Rewritable Indication Label for Recording Medium

When a horizontal magnetic field was applied to the thus-prepared rewritable indication label for a recording medium A, the flake magnetic fine particles in the capsules were oriented horizontal to reflect light, and a very light background was obtained.

Then, a vertical magnetic field as a recording magnetic field was applied to the rewritable indication label for a recording medium A, the flake magnetic fine particles in the capsules were oriented vertical to absorb light, and the label turned black.

Recording by prints with the light background and the black part was enabled, and furthermore, the prints could be rewritten and erased.

As apparent in the above description, the present invention was made based on the fact that some magnetic recording layers and heat-sensitive recording layers can be rewritably printed visibly. This fact was applied to the rewritable indication label for a recording medium A, which comprises a label base layer 1, a rewritable indication device layer 2 on which visible information can be rewritably recorded or erased, and a protection layer 3 for protecting the rewritable indication device layer 2, whereby man can visually see and read the information, and can rewrite and erase the information.

What is claimed is:

1. A rewritable indication label for a recording medium to be adhered to said recording medium, said label comprising:
    a label base layer;
    a rewritable indication device layer provided on said base layer and on which visible information can be rewritably recorded and erased, said rewritable indication device layer comprising a magnetic recording layer including microcapsules containing a liquid and flake magnetic fine particles;
    a protection layer provided on said rewritable indication layer to protect said rewritable indication device layer;
    an adhesive layer provided on a side of said label base layer opposite said rewritable indication device layer; and
    a releasable sheet provided on a side of said adhesive layer opposite said label base layer,
    wherein (1) the flake magnetic fine particles are arranged in a vertical direction when a vertical magnetic field is applied to the magnetic recording layer, and the flake magnetic fine particles are arranged in a horizontal direction when a horizontal magnetic field is applied to the magnetic recording layer and (2) the flake magnetic fine particles have a coercive force of more than 500 oersted.

2. A rewritable indication label for a recording medium according to claim 1, wherein
    the protection layer comprises a resin layer of a resin composition containing a synthetic resin as a main component of a vehicle.

3. A rewritable indication label for a recording medium according to claim 1, wherein
    a primer layer is provided between the rewritable indication device layer and the protection layer.

4. A rewritable indication label for a recording medium according to claim 1, wherein
    a primer layer is provided between the label base layer and the rewritable indication device layer.

5. A recording medium with a rewritable indication label adhered thereto through an adhesive, said rewritable label comprising:
    a label base layer;
    a rewritable indication device layer provided on said base layer and on which visible information can be recorded and erased, said rewritable indication device comprising a magnetic recording layer including microcapsules containing a liquid and flake magnetic fine particles; and
    a protection layer provided on said rewritable indication layer to protect said rewritable indication device layer,
    wherein (1) the flake magnetic fine particles are arranged in a vertical direction when a vertical magnetic field is applied to the magnetic recording layer, and the flake magnetic fine particles are arranged in a horizontal direction when a horizontal magnetic field is applied to the magnetic recording layer and (2) the flake magnetic fine particles have a coercive force of more than 500 oersted.

6. A recording medium case with a rewritable indication label adhered thereto through an adhesive, said rewritable label comprising:
    a label base layer;
    a rewritable indication device layer provided on said base layer and on which visible information can be recorded and erased, said rewritable indication device comprising a magnetic recording layer including microcapsules containing a liquid and flake magnetic fine particles; and
    a protection layer provided on said rewritable indication layer to protect said rewritable indication device layer,
    wherein, (1) the flake magnetic fine particles are arranged in a vertical direction when a vertical magnetic field is applied to the magnetic recording layer, and the flake magnetic fine particles are arranged in a horizontal direction when a horizontal magnetic field is applied to the magnetic recording layer and (2) the flake magnetic fine particles have a coercive force of more than 500 oersted.

* * * * *